United States Patent [19]

Marier

[11] Patent Number: 4,827,802
[45] Date of Patent: May 9, 1989

[54] AUTOMATIC STEP TRANSMISSION FOR SMALL VEHICLES

[75] Inventor: Gregory J. Marier, Brooklyn Park, Minn.

[73] Assignee: Yamaha Hatsudoki Kabushiki Kaisha, Japan

[21] Appl. No.: 49,278

[22] Filed: May 13, 1987

[30] Foreign Application Priority Data

Jul. 8, 1986 [JP] Japan ................................. 61-160336

[51] Int. Cl.⁴ ........................ B60K 41/18; B60K 20/10
[52] U.S. Cl. ........................................ 74/866; 74/335; 74/336 R; 74/863
[58] Field of Search .............. 74/863, 866, 335, 336 R

[56] References Cited

U.S. PATENT DOCUMENTS

| | | | |
|---|---|---|---|
| 2,178,356 | 10/1939 | Brunner | 74/336 X |
| 2,237,264 | 4/1941 | Price | 74/863 |
| 2,522,228 | 9/1950 | Hukill | 74/335 X |
| 2,604,963 | 7/1952 | Randol | 74/335 X |
| 2,631,702 | 3/1953 | Prather | 74/863 X |
| 4,027,544 | 6/1977 | Kobayashi | 474/14 |
| 4,319,657 | 3/1982 | Nomura | 180/219 |
| 4,339,964 | 7/1982 | Isaka | 180/219 X |
| 4,488,519 | 12/1984 | Kishida | 123/52 M |
| 4,499,793 | 2/1985 | Jow et al. | 74/866 |
| 4,550,700 | 11/1985 | Yoshida et al. | 123/432 |
| 4,580,537 | 4/1986 | Uchiyama | 123/352 |

Primary Examiner—Dirk Wright
Attorney, Agent, or Firm—Orrin M. Haugen; Thomas J. Nikolai; Frederick W. Niebuhr

[57] ABSTRACT

An apparatus for automatically operating the transmission of a small internal combustion engine includes an elongate actuator rod pivotally attached at one end to a pivotally mounted gear shift lever. The other end of the rod is contained in a housing, and attached to a diaphragm reciprocable in the housing and dividing the housing into two fluid chambers. Separate fluid conduits join each chamber with the air intake passage of the engine, and are normally open to maintain a relative vacuum in each chamber. A microprocessor receives electrical input signals corresponding to engine RPM, vehicle velocity, throttle setting and other vehicle operating parameters, and generates output signals for momentarily and selectively closing the fluid conduit to one of the chambers, and simultaneously opening the selected chamber to a source of atmospheric pressure. The pressure differential moves the diaphragm and actuator rod to pivot the gear shift lever in a selected direction, thereby shifting the transmission to the next higher or next lower gear. An auxiliary butterfly valve, in the intake passage upstream of the fluid conduit connections with the air intake, is controlled by the microprocessor to close off air flow in the intake passage during shifting.

15 Claims, 4 Drawing Sheets

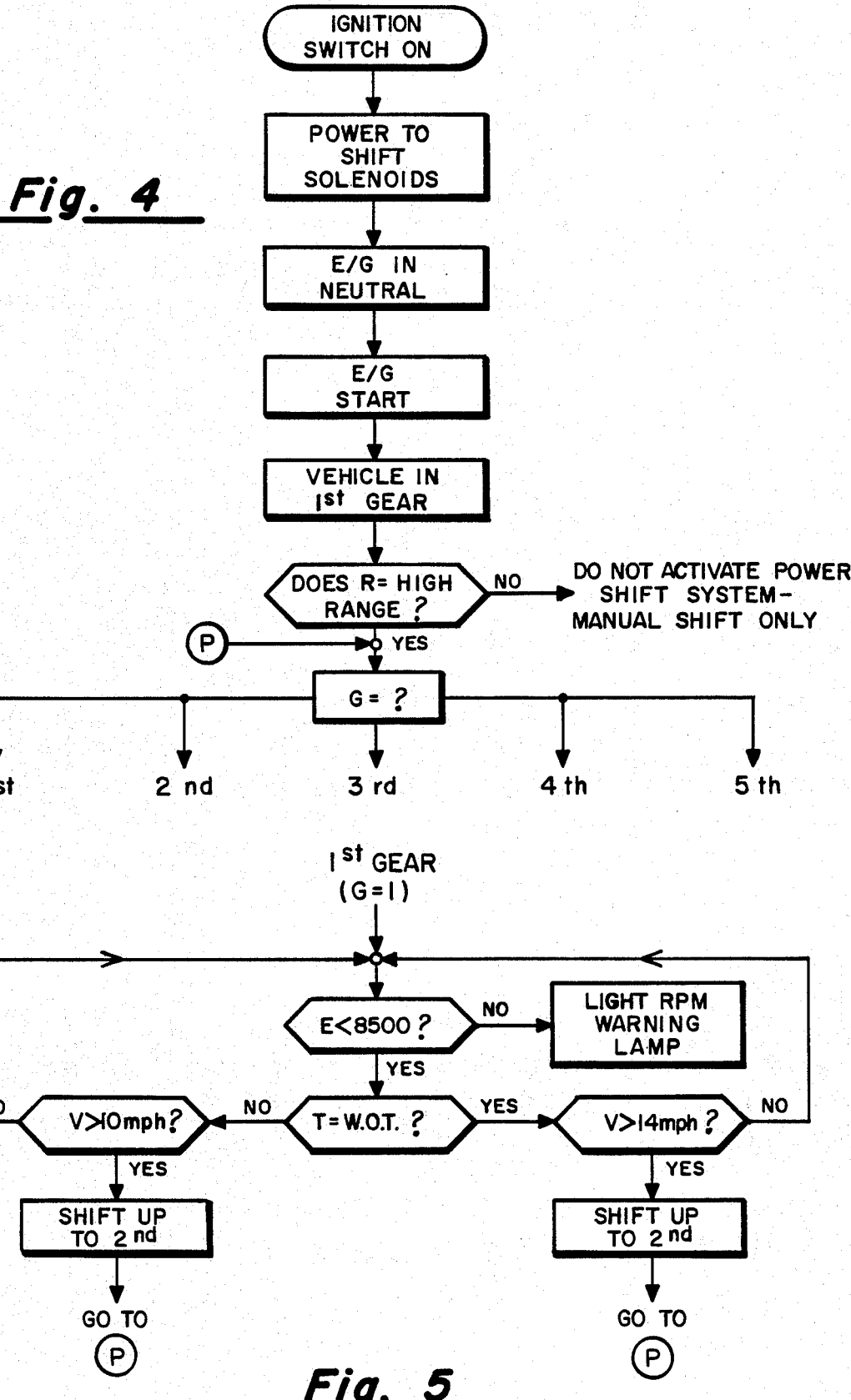

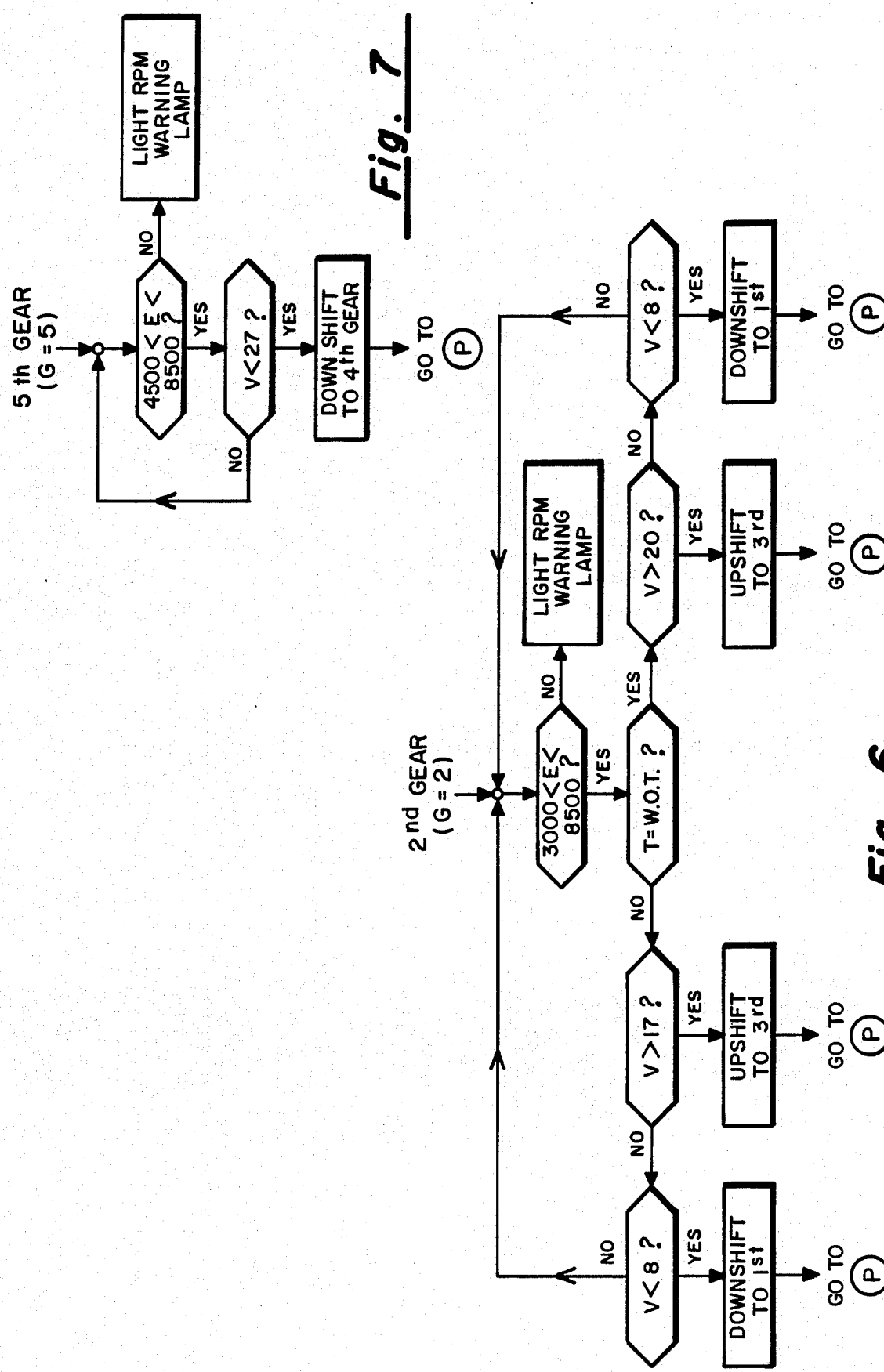

AUTOMATIC STEP TRANSMISSION FOR SMALL VEHICLES

BACKGROUND OF THE INVENTION

This invention relates to automatic transmissions, and particularly to computer controlled step transmissions suited for small vehicle engines Automatic transmissions are universally appreciated for the convenience they afford in operating vehicles Such transmissions are employed most frequently in larger vehicles such as automobiles, because they require power and space not always available in vehicles with smaller engines. Step transmissions for small vehicles tend to be manual. For example, U.S. Pat. No. 4,339,964 (Isaka), assigned to the assignee of this application, shows an internal combustion engine for a motorcycle, in which a crank shaft and transmission are positioned one above the other to minimize the required size of the engine. A gear shift pedal is pivotable manually in opposite directions for shifting to either a higher or lower gear. A torsion spring returns the pedal to substantially the same rest position after each shift.

An alternative small vehicle transmission is disclosed in U.S. Pat. No. 4,027,544 (Kobayashi), also owned by the present assignee. A sliding sheave is moved continuously closer to an axially fixed sheave on a driving shaft, thus to position a V-belt gradually radially outward as driving shaft velocity increases. While this arrangement continuously and smoothly changes the gear ratio, it lacks the power transmitting efficiency of step transmissions. Automatic step transmission systems are being developed in the automobile industry. Typically, these systems control hydraulic power actuators through a computer. These systems, however, are complex and require auxiliary power for the hydraulic actuators, power typically not conveniently available in smaller engines. In addition, automatic transmissions for certain recreational vehicles, for example all-terrain vehicles or four-wheel drive vehicles, must adapt to unique conditions, for example hill climbing, rarely encountered by ordinary passenger automobiles. Thus there is a general tendency to favor manual transmissions in such vehicles.

Therefore, it is an object of the present invention to provide an automatic step transmission suitable for use with small internal combustion engines.

Another object of the invention is to provide an automatic step transmission for small vehicles that uses the normal engine manifold vacuum as its power source.

Another object is to provide, in an internal combustion engine for a small vehicle, a transmission that affords smooth shifting without undue sacrifice in transmitted power.

Yet another object of the invention is to provide an automatic step transmission that adapts to the wide variety of conditions encountered by all-terrain vehicles and the like.

SUMMARY OF THE INVENTION

To achieve these and other objects, there is provided a vacuum powered transmission control apparatus for an internal combustion engine. The control apparatus includes a gear shift means mounted with respect to an internal combustion engine to reciprocate relative to the engine. The shift means moves in a first direction to shift a transmission of the internal combustion engine to a higher operating gear, and in a second, opposite direction to shift the transmission to a lower gear. Means are provided to move the shift means, including a housing mounted with respect to the engine. A partition in the housing divides the interior of the housing into adjacent first and second fluid chambers, and the partition is reciprocable relative to the housing in response to a fluid pressure differential between the first and second chambers. A linkage means connects the shift means to the partition, for reciprocating the shift means as the partition reciprocates. A first fluid conduit is provided between an intake passage of the internal combustion engine and the first chamber. A first valve means along the first fluid conduit is operable between first and second conditions for opening and closing the first conduit, respectively. A second fluid conduit is provided between the intake passage and the second chamber. A second valve means along the second conduit is operable between first and second positions for opening and closing the second fluid conduit, respectively. A valve control means maintains the first and second valve means normally in the same condition. Alternatively, the valve control means selectively positions one of the valve means in the other of the conditions to cause a pressure differential between the first and second chambers, moving the partition to move the shift lever in a selected one of the first and second directions.

Preferably, a throttling means is provided in the intake passage upstream of the first and second fluid conduits. A throttle control means is used to selectively actuate the throttling means to substantially prevent passage of air past the throttling means substantially whenever the valve control means selectively alters the condition of one of the valve means. The throttling means can be a solenoid controlled butterfly valve, normally biased open but closing in response to solenoid actuation.

Each valve means includes a vacuum actuated valve biased normally to keep its associated fluid conduit open, a further fluid conduit between the vacuum actuated valve and the intake passage, and a shift solenoid actuable to open the further fluid conduit and provide a vacuum to the vacuum actuated valve, thereby adjusting the vacuum actuated valve to its closed condition. Preferably, the vacuum actuated valve, when so adjusted, also places its associated chamber in fluid communication with a source of atmospheric pressure.

Another aspect of the present invention is a process for selectively shifting the transmission of an internal combustion engine, wherein a gear shift lever, mounted pivotally with respect to the engine, pivots in a first direction to shift the transmission to a higher gear, and pivots in a second, opposite direction to shift the transmission to a lower gear. The process includes the steps of:

(a) linking the gear shift lever to a reciprocable partition positioned between first and second substantially enclosed chambers;
(b) normally maintaining the first and second chambers at a selected vacuum pressure level; and
(c) for a selected time, substantially increasing the pressure in a selected one of the chambers to move the partition in a selected direction, thereby to move the shift lever in a selected one of the first an second directions.

Preferably, the selected time for increasing the pressure in one of the chambers is based upon one or more of the following vehicle operating parameters: vehicle speed; operating gear; throttle position; and engine speed (RPM).

A microprocessor, for example a read-only memory (ROM), can be programmed to process electrical inputs based upon these parameters, with the output of the ROM controlling the timing of the pressure increase, and the chamber selected Additional signal inputs to the ROM can be based on whether the vehicle brake is being applied, whether an all-terrain vehicle is set to operate in an alternative mode in which the shift points are intentionally set at higher engine RPM.

These input signals can be used to operate an automatic transmission in a manner particularly well suited to all-terrain vehicles. For example, the vehicle speed input signal can prevent premature up-shifting if a high throttle indication is due to spinning of the vehicle wheels, or in hill climbing and other situations demanding high power. Further, the braking input can cause a down-shift at a higher engine RPM than otherwise would be the case, to enable the transmission to be fully shifted down into first gear when the vehicle is rapidly decelerated.

The present invention has a broad utility in its use of engine vacuum for shifting, thus requiring no hydraulic or other auxiliary power. Properly timed actuation of the auxiliary throttle valve in connection with the vacuum actuated valves ensures smooth shifting, while substantially retaining the available power transfer of manually operated step transmissions.

IN THE DRAWINGS

The above and other features of the invention are more fully appreciated upon consideration of the following detailed description and the drawings, in which:

FIG. 1 is a diagrammatic view of apparatus constructed in accordance with the present invention for operating the shift lever of a step transmission;

FIG. 2 a schematic view of an alternative apparatus for controlling the shift lever;

FIGS. 4–7 are portions of a flow chart illustrating programmed operation apparatus of FIG. 3;

DETAILED DESCRIPTION OF THE PREFERRED EMBODIMENT

Figure 1:
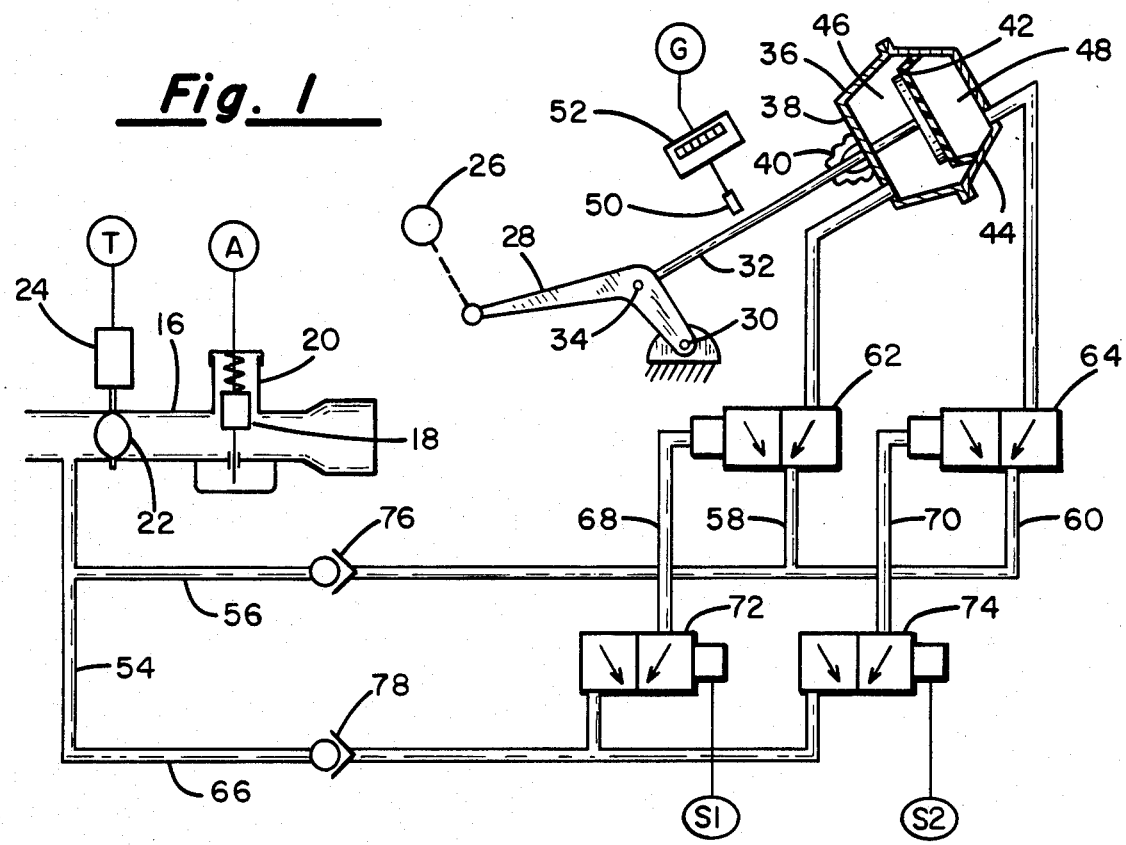

Turning now to the drawings, FIG. 1 diagrammatically illustrates certain portions of an internal combustion engine and transmission suitable for a small ground-engaging vehicle. More particularly, an intake passage 16 of the engine provides a charge of fuel and air to the combustion chamber area of the engine. The air flow through intake passage 16 is controlled by a manually adjustable throttle valve 18 housed in a carburetor 20 along the passage. Further downstream is an auxiliary throttle valve in the form of a butterfly valve 22 controlled by a throttle solenoid 24. The throttle solenoid is spring biased to normally maintain butterfly valve 22 in an open position as shown, but can be actuated to close the butterfly valve against the spring force and cut off air flow in the passage.

The transmission of the internal combustion engine includes a transmission drum 26 and a gear shift lever 28 for selectively rotating drum 26 to shift the transmission. The connection between shift lever 28 and drum 26 can be, for example, as described in the aforementioned U.S. Pat. No. 4,339,964. Essentially, shift lever 28 is pivotally mounted with respect to the internal combustion engine at a pivot axis 30, and can be pivoted in a clockwise direction as viewed in FIG. 1 for shifting the transmission to a higher gear, and in a counterclockwise direction for down-shifting. A spring (not shown) can be employed to return shift lever 28 to substantially the same position after each shift, as described in the Isaka Patent. Each shift of the transmission is accomplished by pivoting lever 28 in the desired direction, the first 10°–12° of rotation in each case disengaging the clutch, with the remainder of each rotation selecting the next gear.

Typically gear shift lever 28 is manually operated in connection with a foot pedal or the like. Illustrated in the figure is a shift lever control means which can be employed in addition to or in lieu of manual operation. This apparatus includes an elongate lever actuating rod 32 mounted to lever 28 at a pivot axis 34, and extended into an enclosed, substantially fluid tight housing 36 through an opening in a forward wall 38 of the housing. A pliable annular seal 40 connected to rod 32 and wall 40 accommodates longitudinal rod movement while maintaining the fluid seal.

The end of rod 32 inside housing 36 is attached to a diaphragm 42 which is generally planar, but with a flexible periphery connected to an annular wall 44 of the housing. Diaphragm 42 functions as a partition to divide the interior of housing 36 into two adjacent fluid chambers, a first chamber 46 and a second chamber 48.

The normal, at-rest position for gear shift lever 28 corresponds to a substantially centered location for diaphragm 42 in housing 36, with chambers 46 and 48 substantially equal in volume. Responsive to a pressure differential between the first and second chambers, diaphragm 42 moves in the direction to diminish the size of the lower pressure chamber, pivoting gear shift lever 28. Thus, the gear shift lever can be pivoted either clockwise or counterclockwise, by introducing a comparatively high pressure to first chamber 46 or second chamber 48, respectively. An optical sensor 50 registers longitudinal movement of rod 32, and sends a signal to an up/down counter 52 corresponding to the direction of rod movement from the normal position. Counter 52 thus generates an output indicating the current operating gear of the transmission.

The relative pressure in chambers 46 and 48 is determined by a pair of valve controlled fluid conduits, one associating each of the chambers with intake passage 16, specifically at a point along the passage downstream of butterfly valve 22. Cooperating to form various conduits are a pneumatic trunk line 56 open to the intake passage, a main vacuum line 56 having first and second main branch lines 58 and 60 to chambers 46 and 48 respectively. A first vacuum actuated valve 62 is provided along branch line 58, with a substantially identical second vacuum actuated valve 64 provided along branch line 60. The system further includes an auxiliary line 66, and first and second auxiliary branch lines 68 and 70 leading to first and second vacuum actuated valves 62 and 64, respectively. Provided along first auxiliary branch line 68 is a first master shift solenoid 72, and a second master shift solenoid 74 is similarly provided along auxiliary branch line 70. Main line 56 and auxiliary line 66 are provided with one-way valves 76 and 78, respectively, to allow flow of air along these lines only when air pressure in intake passage 16 is less than the pressure in lines 56 and 66.

The main and auxiliary lines and branch lines cooperate to form a pneumatic system of valve-controlled fluid conduits between intake passage 16 and chambers 46 and 48. Trunk line 54, main vacuum line 56 and branch line 58 form a first conduit joining the intake passage and first chamber 46, while lines 54 and 56 and second branch line 60 form a second fluid conduit between the intake passage and second chamber 48. Likewise, trunk line 54, auxiliary line 66 and auxiliary branch line 68 form a third fluid conduit between intake passage 16 and first vacuum actuated valve 62, while lines 54 and 66 and second auxiliary branch line 70 form a fourth fluid conduit between the air intake passage and second vacuum actuated valve 64.

During usual engine operation, i.e. when no shifting occurs, the pneumatic system is in a normal configuration to maintain chambers 46 and 48 at a vacuum relative to atmospheric pressure, as a result of the engine manifold vacuum. Vacuum actuated valves 62 and 64 both are in an open or "vacuum-on" condition in which the first and second fluid conduits are open. The open condition corresponds to no vacuum being supplied to these valves through the third or fourth conduit, i.e., master shift solenoids 72 and 74 are normally closed.

When shifting one of shift solenoids 72 and 74 is actuated to open the associated fluid conduit to the associated vacuum actuated valve. For example, when shifting to a higher gear is desired, first shift solenoid 72 is actuated to open the third fluid conduit. This immediately creates a relative vacuum at first valve 62, thus closing the second fluid conduit and simultaneously connecting first chamber 46 with air at atmospheric pressure through valve 62. Valve 62 thus is closed with reference to the second fluid conduit, but open in the sense of supplying air at atmospheric pressure to the first chamber.

As the second fluid conduit remains open to manifold vacuum, second chamber 48 is kept at a relative vacuum as the pressure in first chamber 46 increases toward atmospheric pressure, creating a pressure differential sufficient to move diaphragm 42 rightward as viewed in the figure, thus pivoting gear shift lever 28 clockwise to shift the transmission to the next higher gear. In the event that down-shifting is desired, second shift solenoid 74 is actuated to create a relative vacuum at second vacuum actuated valve 64, thus to provide the desired pressure differential in favor of second chamber 48 to pivot the gear shift lever counterclockwise.

One feature of the present invention resides in the ability to smoothly and quickly shift gears. Smooth, rapid shifting stems from a properly timed actuation of throttle solenoid 24, to cut off air flow through intake passage 16 during actuation of a chosen one of shift solenoids 72 and 74. Shifting smoothness is enhanced because the closing of butterfly valve 22 causes a momentary decrease in engine power during shifting. Consequently the gear shift shock is relatively small, even if the operator controlled throttle valve is open to a full throttle setting.

Secondly, since the engine continues running with intake passage 16 effectively closed by butterfly valve 22, it tends to rapidly pull air into passage 16 from whichever of the first and second fluid conduits remains open during shifting. For example, when shift solenoid 72 is actuated to close first valve 62, the generally simultaneous closure of butterfly valve 22 causes the engine to evacuate second chamber 48. Thus, regardless of the desired shift direction, one of the fluid chambers is rapidly evacuated while pressure in the other chamber is rapidly increasing toward atmospheric pressure.

Another related feature of the invention is the maintenance of a relative vacuum pressure in chambers 46 and 48 during normal operation, as opposed to normally maintaining the chambers at atmospheric pressure. This requires one-way valve 76 in main vacuum line 56, which otherwise would not be necessary. However, the shifting action is substantially more rapid, when compared to a system normally maintaining atmospheric pressure in the chambers.

Figure 2:
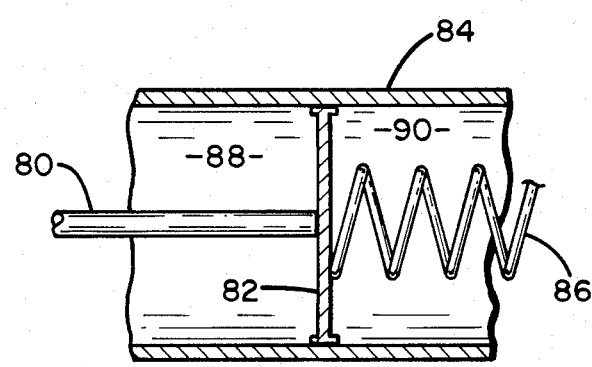

FIG. 2 illustrates an alternative mechanism for controllably pivoting gear shift lever 28, through an elongate piston rod 80 substantially similar to actuating rod 32. Piston rod 80 is connected to a disc-shaped piston 82 which is free to reciprocate within a canister 84, but is normally maintained in the center of the canister by a coil spring 86.

As is true with housing 36 and diaphragm 42, piston 82 divides the interior of canister 84 into first and second chambers 88 and 90. A pressure differential drives piston 82 in a direction of the lower pressure chamber, against the restoring force of spring 86.

Figure 3:
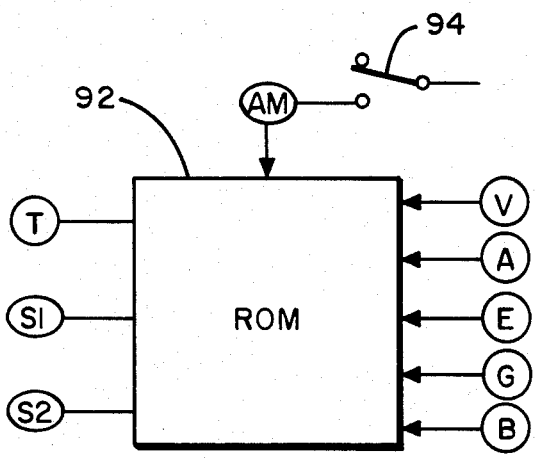
FIG. 3 is a diagrammatic view of apparatus for controlling the apparatus of FIG. 1.

While shift solenoids 72 and 74 could be manually actuated, a substantial advantage resides in the sensing of various vehicle and engine parameters, and controlling gear shift lever 28 in accordance with the sensed parameters. FIG. 3 illustrates a preferred embodiment of a means for controlling the shift and throttle solenoids, namely a microprocessor 92 which can be, for example, a read-only memory (ROM). A plurality of electrical signal inputs are provided to microprocessor 92, some of which essentially are stepped "digital" inputs, and others which are analog in nature. The analog inputs include an input V, the level (e.g. frequency) of which varies linearly with the vehicle speed. In a rear-wheel drive vehicle, the preferred location for sensing vehicle speed to generate input V is at a front wheel, to avoid misreading rear wheel spin as vehicle velocity. A second analog input is an input E, the frequency of which varies linearly with engine speed (RPM).

An input A corresponds to the output similarly labeled in FIG. 1, and has a frequency which varies with the position of throttle valve 18. Input A can vary in analog fashion, or can be segmented into discrete levels corresponding to different throttle positions such as idle, low, medium, high and wide open.

Other discrete level inputs include an input G which has five different frequency levels corresponding to the five different forward gears of the transmission, an input B having two signal levels, one of which is on whenever the brakes are applied, and an alternate mode input AM having two levels, depending on the position of an alternate mode switch 94 used by the vehicle operator to select higher speed shifting levels corresponding to higher power for off-the-road conditions.

One or more of the input signals to microprocessor 92 is used to generate three output signals, each of which is a two-level digital signal: an output T for actuating throttle solenoid 24, an output S1 for actuating first shift solenoid 72, and an output S2 for actuating second shift solenoid 74.

FIGS. 4–7 comprise a simplified flow chart illustrating operation of the valve control means, particularly with the engine operating in the first, second and fifth of the five available gears. Generally, microprocessor 92 is programmed to process the input signals in accordance with the flow chart. The techniques for such programming are well known, and the details of a program would vary with the type of microprocessor selected. Accordingly, specific steps and routines of such a program are not disclosed herein, as they are not directly pertinent to the invention.

As seen from FIG. 4, a number of requisite conditions must exist before microprocessor 92 is enabled. The ignition switch must be on and the twelve volt power must be available to shift solenoids 72 and 74. The operator must have manually shifted the transmission into neutral, started the engine, and put the transmission into first gear. At that point, if the operator has selected the automatic shift option (R=high range), microprocessor 92 will sample input G to determine the gear, which of course is first gear.

As seen in FIG. 5, once input G has been read to determine the transmission is in first gear, input E is sampled. If the indicated engine speed is greater than or equal to 8500 RPM, a warning light is activated to indicate that the engine speed is too high. If the engine speed is less than 8500 RPM, however, then input T is sampled to determine whether the setting is wide open.

Regardless of the throttle setting, vehicle speed input V is next sampled. If the throttle is wide open and input V indicates a vehicle velocity of greater than fourteen miles per hour, a shift up to second gear is indicated, causing microprocessor 92 to actuate throttle solenoid 24 and first shift solenoid 72. So long as the velocity is less than fourteen miles per hour the transmission remains in first gear.

However, if input T indicates the throttle is not wide open, a shift up to second gear will occur if the velocity is greater than ten miles per hour. The lower throttle setting indicates the vehicle operator,s desire to cruise at low speed, and the upward shift at lower vehicle speed allows such cruising to continue in the comparatively more fuel-efficient second gear.

An upward shift to second gear, when sensed by the microprocessor, causes the microprocessor to operate in accordance with the portion of the flow chart shown in FIG. 6. Input E is sampled to determine an indication of engine RPM between 3000 and 8500 RPM. If actual RPM is outside of this range, the warning lamp is activated. Otherwise, input T is sampled for an indication that the throttle is wide open. If the throttle is wide open and input V indicates a vehicle speed of greater than twenty miles per hour, an up-shift to third gear is indicated and solenoids 24 and 72 are actuated once again. An indication that engine speed is twenty miles per hour or less maintains the transmission in second gear, unless the speed falls below eight miles per hour, whereupon a down-shift is indicated and second shift solenoid 24 and second shift solenoid 74 are actuated. For an indicated throttle condition other than wide open, up-shift occurs for an indication of a vehicle speed greater than seventeen miles per hour, while the down-shift point remains at eight miles per hour.

Flow chart portions corresponding to third gear and fourth gear are similar to the portion corresponding to second gear and are not illustrated. It is seen in FIG. 7 that the flow chart portion corresponding to fifth gear is comparatively simple, with the input E sampled for ana indication that engine speed is between 4500 and 8500 RPM. If so, the transmission remains in fifth gear so long as the vehicle speed is twenty-seven miles per hour or greater. When input V indicates a vehicle speed below twenty-seven miles per hour, solenoids 24 and 74 are actuated to down-shift to fourth gear.

Figure 8:
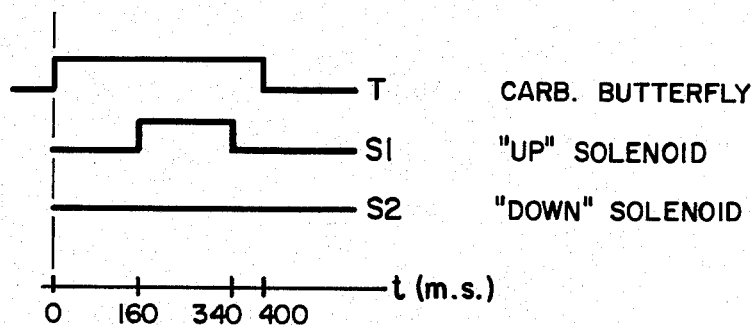
FIGS. 8 and 9 are timing diagrams illustrating shifting under certain conditions.
Figure 9:
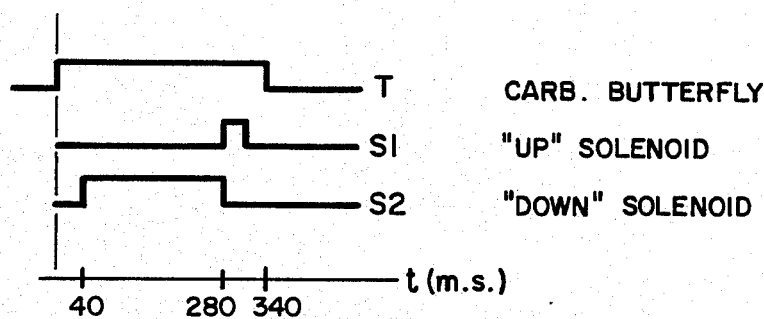

FIGS. 8 and 9 are timing diagrams of the output signals of microprocessor 92 for an exemplary up-shift and down-shift, respectively. The up-shift in FIG. 8 can occur at the medium, high and wide open throttle settings. The time axis is in milliseconds. Throttle solenoid 24 is actuated one hundred sixty milliseconds before actuation of first shift solenoid 72, to ensure a sufficient interruption in engine power for smooth shifting. Output S1 is held high for one hundred eighty milliseconds, maintaining solenoid 72 actuated to avoid any jerk or re-coil of gear shift lever 28. Output T is kept high for sixty milliseconds after output S1 has returned to low, again to maintain the power interruption and enhance smooth shifting.

As seen in FIG. 9, a down-shift is similarly kept smooth by maintaining output T in its high or active condition for a relatively long time, in this case three hundred forty milliseconds. Second shift solenoid 74 is actuated forty milliseconds after throttle solenoid 24, and maintained in the active condition for two hundred forty milliseconds. Immediately following the re-set of solenoid 74, first solenoid 72 is actuated for just forty milliseconds, to provide a powered return of diaphragm 42 to its normal position. This down-shift timing is used whenever input T indicates a medium, high or wide open throttle setting.

Figure 10:
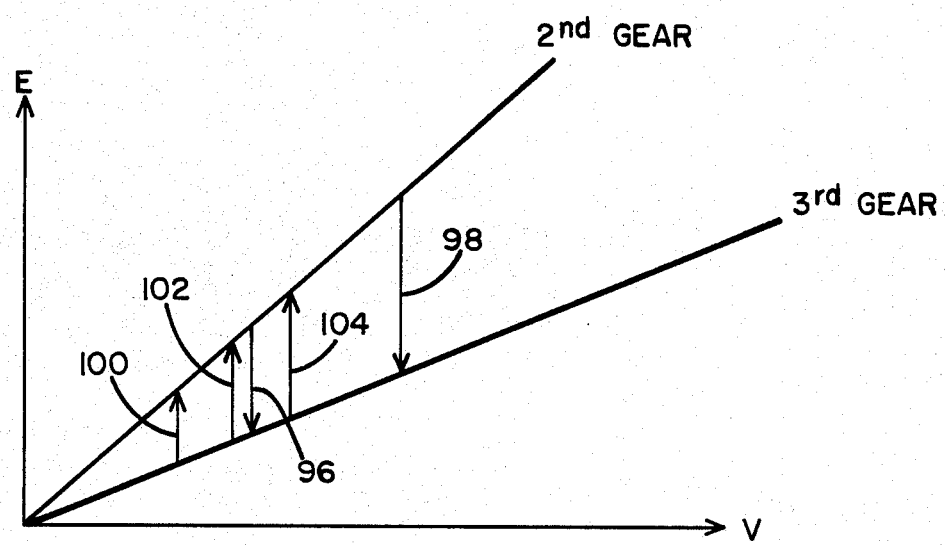
FIG. 10 is a graphical illustration of vehicle speed versus engine RPM, illustrating shift points for various throttle positions.

FIG. 10 graphically illustrates shift points between second and third gear, on a graph of engine speed versus vehicle speed. Lines 96 and 98 represent the upward shift points corresponding to a low throttle setting and wide open throttle setting, respectively, and show that under wide open throttle, the transmission remains in second gear for a longer time for greater power and more rapid acceleration. The down-shift points for low throttle and wide open throttle are shown respectively at 100 and 102. Acceleration down-shift point 102, not included in the flow chart, enables a "kick-down" to a lower gear, in this case second gear, for a higher power, more rapid acceleration. Line 104 indicates a down-shift at the low throttle setting, but with input B active to indicate that the vehicle operator is applying the brakes. By shifting downward into second gear at a higher vehicle speed, the braking action of the engine is more effectively employed to decelerate the vehicle.

Finally, whenever the vehicle operator selects the alternative mode of operation, input AM to microprocessor 92 is active, and has the effect of moving all shift points upward to a higher vehicle speed. While this feature is not illustrated, it can be appreciated that in the alternate mode, the operator can drive the vehicle at greater speeds in the lower, relatively higher power gears, a particular advantage when the vehicle is operated off-the-road, for hill climbing and the like.

What is claimed is:

1. A vacuum powered transmission control apparatus for an internal combustion engine, including:
   a gear shift means mounted with respect to an internal combustion engine to reciprocate relative thereto, said shift means movable in a first direction to shift a transmission of said internal combustion engine to a higher operating gear, and in a second and opposite direction to shift said transmission to a lower operating gear;
   a means for moving said shift means including a housing mounted with respect to said internal combustion engine; a partition in said housing for dividing the interior of said housing into adjacent first and second fluid chambers, said partition being reciprocable relative to said housing in response to a fluid pressure differential between said first and second chambers; and a linkage means connecting said shift means to said partition, for reciprocating said shift means as said partition reciprocates;

a first fluid conduit between an intake passage of said internal combustion engine and said first chamber, and a first valve means along said first fluid conduit and operable between first and second conditions for opening and closing said first conduit, respectively;

a second fluid conduit between said intake passage and said second chamber, and a second valve means along said second conduit and operable between first and second conditions for opening and closing said second fluid conduit, respectively;

a manually adjustable first throttling means in said intake passage;

a valve control means for maintaining said first and second valve means normally in the same one of said first and second conditions and alternatively for selectively positioning one of said valve means in the other of said conditions to cause a pressure differential between said first and second chambers, moving said partition to move said shift lever in a selected one of said first and second directions; and a second throttling means in said intake passage at a location upstream of said first and second fluid conduits, and a throttle control means for selectively actuating said second throttling means in a manner to substantially prevent passage of air past said second throttling means substantially whenever said valve control means selectively alters the condition of one of said valves.

2. The apparatus of claim 1 wherein:
said control means normally maintains said first and second valve means in said first condition, and wherein each of said valve means, when in said second position, places its associated fluid chamber in fluid communication with a source of atmospheric pressure.

3. The apparatus of claim 1 wherein:
said second throttling means comprises a butterfly valve, a biasing means for maintaining said butterfly valve normally open, and a solenoid operatively connected to said butterfly valve and actuable to close said butterfly valve against the force of said biasing means.

4. The apparatus of claim 1 wherein:
said first valve means includes a first vacuum actuated valve normally in an open condition, a third fluid conduit between said first vacuum actuated valve and said intake passage, and a first shift solenoid along said third fluid conduit and actuable to open said third fluid conduit to provide a vacuum to said first vacuum actuated valve, thereby adjusting said first vacuum actuated valve to a closed condition; and wherein said second valve means comprises a second vacuum actuated valve normally in an open condition, a fourth fluid conduit between said second vacuum actuated valve and said intake passage, and a second shift solenoid along said fourth fluid conduit and actuable to open said fourth fluid conduit to provide a vacuum to said second vacuum actuated valve, thereby adjusting said second vacuum actuated valve to a closed condition.

5. The apparatus of claim 2 wherein:
said partition is comprised of a diaphragm fastened at its periphery to said housing near the center thereof, and extended across the interior of said housing, and said linkage means includes an elongate actuating rod mounted at one end to said diaphragm, extended through an opening in said housing, and mounted at an opposite end to said shift means.

6. The apparatus of claim 2 wherein:
said partition comprises a substantially planar piston spanning substantially the cross-sectional area of said housing interior, and a coil attached at opposite ends to said piston and said housing for normally maintaining said piston substantially centered in said housing, and wherein said linkage means includes an elongate piston rod connected at one end to said piston, extended through an opening in said housing, and mounted at an opposite end to said shift means.

7. The apparatus of claim 1 wherein said internal combustion engine is mounted with respect to a ground engaging vehicle, and said apparatus further includes:
a first sensing means for sensing a variable operational parameter of said vehicle and generating a first signal having a signal level that varies with said parameter, and an automatic shift control means for operating said valve control means to so move said shift means in said first direction responsive to a predetermined first minimum level in said first signal, and to so move said shift lever in said second direction responsive to a predetermined maximum level in said first signal.

8. The apparatus of claim 7 including:
a second sensing means for generating a second signal responsive to the application of braking action to said vehicle and for supplying said second signal as an input to said automatic shift control means, whereby said shift control means, responsive to said second signal, so moves said shift lever in said first direction responsive to a predetermined second minimum level in said first signal greater than said predetermined first minimum level.

9. A vacuum actuated transmission control apparatus including:
a gear shift lever mounted with respect to an internal combustion engine and movable to reciprocate with respect to said engine in a firs direction to shift a transmission of said engine to a higher gear, and in a second and opposite direction to shift said transmission to a lower gear;

a vacuum responsive means for moving said shift lever including a housing mounted with respect to said engine; a partition in said housing dividing the interior of said housing into adjacent first and second fluid chambers, said partition being reciprocable relative to said housing in response to a fluid pressure differential between said first and second chambers; and a linkage means connecting said shifting lever to said partition for reciprocating said lever as said partition reciprocates;

a first fluid conduit between an air intake passage of said internal combustion engine and said first chamber, and a first valve means along said first fluid conduit and adjustable between first and second conditions for opening and closing said first fluid conduit, respectively;

a second fluid conduit between said air intake passage and said second chamber, and a second valve means along said second fluid conduit and adjustable between first and second conditions for opening and closing said second conduit, respectively;

a manually adjustable first throttling means in said intake passage;

a valve control means for maintaining said first and second valves normally in said first condition to maintain a relative vacuum in said first and second chambers, and for selectively adjusting one of said valves to said second condition to close the associated one of said fluid conduits, and further for introducing atmospheric pressure into the associated one of said chambers to provide a pressure imbalance between said chambers, moving said partition to move said shift lever in the selected one of said first and second directions; and a second throttling means in said intake passage at a location upstream of said first and second fluid conduits, and a throttle control means for selectively actuating said second throttling means in a manner to substantially prevent passage of air past said second throttling means substantially whenever said valve control means selectively adjusts one of said valve to said second condition.

10. A process for selectively shifting the transmission of an internal combustion engine, wherein a gear shift means is mounted with respect to said engine to move in a first direction to shift said transmission to a higher gear, and to move in a second and opposite direction to shift said transmission to a lower gear; said process comprising the steps of:

(a) operably linking aid gear shift means to a reciprocable partition positioned between first and second substantially fluid-tight cambers;

(b) maintaining an independently fluid communication between each of said first and second chambers and an air intake passage of said internal combustion engine to normally maintain said first and second chambers at a selected vacuum pressure level;

(c) for a selected time, substantially increasing the pressure in a selected one of said first and second chambers by interrupting the fluid communication between said selected chamber and said air intake passage, thereby to move said shift lever in a selected one of said first and second directions; and (d) providing in said air intake passage a manually adjustable first throttling means and a second throttling means, and selectively actuating said second throttling means to substantially terminate the passage of air through said air intake passage substantially during said selected time.

11. The process of claim 10 wherein:

step (c) includes simultaneously connecting said selected chamber to a source of atmospheric pressure.

12. The apparatus of claim il wherein:

step (c) further includes sensing a variable operational parameter of a ground engaging vehicle propelled by said internal combustion engine, and either one of:

(i) so moving said shift lever in said first direction responsive to the sensing of a predetermined first minimum level of said operational parameter, and (ii) so moving said shift lever in said second direction responsive to the sensing of a predetermined maximum level of said operational parameter.

13. The process of claim 12 wherein step (c) further includes:

sensing the application of braking action to said vehicle for at least a selected minimum time and, responsive to said sensing of said braking action, so moving said shift lever in said first direction responsive to the sensing of a predetermined second minimum level of said operating parameter greater than said predetermined first minimum level.

14. A vacuum powered transmission control apparatus for an internal combustion engine mounted with respect to a ground engaging vehicle, said transmission control apparatus including:

a gear shift means mounted with respect to an internal combustion engine to reciprocate relative thereto, said internal combustion engine being mounted with respect to a ground engaging vehicle, said shift means being movable in a first direction to shift a transmission of said internal combustion engine to a higher operating gear, and in a second and opposite direction to shift said transmission to a lower operating gear;

a means for moving said shift means including a housing mounted with respect to said internal combustion engine; a partition in said housing for dividing the interior of said housing into adjacent first and second fluid chambers, said partition being reciprocable relative to said housing in responsive to a fluid pressure differential between said first and second chambers; and a linkage means connecting said shift means a to said partition, for reciprocating said shift means as said partition reciprocates;

a first fluid conduit between an intake passage of said internal combustion engine and said first chamber, and a first valve means along said first fluid conduit and operable between first and second conditions for opening and closing said first conduit, respectively;

a second fluid conduit between said intake passage and said second chamber, and a second valve means along said second conduit and operable between first and second conditions for opening and closing said second fluid conduit, respectively;

a valve control means for maintaining said first and second valve means normally in the same one of said first and second conditions, and alternatively for selectively positioning one of said valve means in the other of said conditions to cause a pressure differential between said first and second chambers, moving said partition to move said shift lever in a selected one of said first and second directions;

a first sensing means for sensing a variable operational parameter of said vehicle and generating a first signal having a signal level that varies with said parameter, and an automatic shift control means for operating said valve control means to so move said shift means in said first direction responsive to a predetermined first minimum level in said first signal, and to so move said shift lever in said second direction responsive to a predetermined maximum level in said first signal; and a second sensing means for generating a second signal responsive to the application of braking action to said vehicle and for supplying said second signal as an input to said automatic shift control means, whereby said shift control means, responsive to said second signal, so moves said shift lever in said first direction responsive to a predetermined second minimum level in said first signal greater than said predetermined, first minimum level 15. A process for selectively shifting the transmission of an internal combustion engine, wherein a gear shift means is mounted with respect to said engine to move in a first direction to shift said transmission to a higher gear, and to move in a second and opposite direction to shift said transmission to a lower gear; said process comprising the steps of:
  (a) operably linking said gear shift means to a reciprocable partition positioned between first and second substantially fluid-tight chambers;
  (b) maintaining an independent fluid communication between each of said first and second chambers and an air intake passage of said internal combustion engine, to normally maintain said first and second chambers at a selected vacuum pressure level;
  (c) sensing a variable operation parameter of a ground engaging vehicle propelled by said internal combustion engine;
  (d) responsive to said sensing and for a selected time, substantially increasing the pressure in a selected one of said first and second chambers by interrupting the fluid communication between said selected chamber and said air intake passage, to move said partition in a selected direction, thereby to either:
    (i) move said shift lever in said first direction responsive to the sensing of a predetermined first minimum level of said operational parameters; or
    (ii) move said shift lever in said second direction responsive to the sensing of a predetermined maximum level of said operational parameter; and
  (e) sensing the application of braking action to said vehicle for at least a predetermined minimum time and, responsive to said sensing of said braking action, so moving said shift lever in said first direction responsive to the sensing of a predetermined second minimum level of said operating parameter greater than said predetermined first minimum level;
  (f) for said selected time, connecting said selected chamber to a source of atmospheric pressure; and
  (g) substantially terminating the passage of air through said air intake passage substantially during said selected time.

* * * * *

UNITED STATES PATENT AND TRADEMARK OFFICE
CERTIFICATE OF CORRECTION

PATENT NO. : 4,827,802

DATED : May 9, 1989

INVENTOR(S) : Gregory J. Marier

It is certified that error appears in the above-identified patent and that said Letters Patent is hereby corrected as shown below:

Column 9, Line 11, "sand" should read -- and --.

Column 9, Line 24, insert comma -- , -- after "conditions".

Column 9, Line 46, "1" should read -- 2 --.

Column 9, Line 53, "1" should read -- 2 --.

Column 10, Line 16, insert -- spring -- before "attached".

Column 10, Line 51, "firs" should read -- first --.

Column 11, Line 28, "valve" should read -- valves --.

Column 11, Line 36, "aid" should read -- said --.

Column 11, Line 39, "independently" should read -- independent --.

Column 11, Line 61, "il" should read -- 11 --.

UNITED STATES PATENT AND TRADEMARK OFFICE
CERTIFICATE OF CORRECTION

PATENT NO. : 4,827,802

DATED : May 9, 1989

INVENTOR(S) : Gregory J. Marier

It is certified that error appears in the above-identified patent and that said Letters Patent is hereby corrected as shown below:

Column 12, Line 33, "responsive" should read -- response --.

Column 12, Line 36, delete "a" after "means".

Column 13, Line 7, insert period -- . -- after "level".

Column 13, Line 23, "operation" should read -- operational --.

Signed and Sealed this

Twenty-second Day of May, 1990

Attest:

HARRY F. MANBECK, JR.

*Attesting Officer*                *Commissioner of Patents and Trademarks*